United States Patent

[11] 3,618,713

| [72] | Inventor | Robert L. Batchelor<br>412 Beach Road, Venice, Fla. 33595 |
|---|---|---|
| [21] | Appl. No. | 884,641 |
| [22] | Filed | Dec. 12, 1969 |
| [45] | Patented | Nov. 9, 1971 |

[54] FOAM LUBRICATING SYSTEM AND METHOD
14 Claims, 3 Drawing Figs.

[52] U.S. Cl. .................................................. 184/15 R,
239/343, 261/DIG. 26
[51] Int. Cl. .................................................. F16n 15/00
[50] Field of Search.......................................... 184/15, 15
A, 1 E; 74/230; 159/DIG. 14; 261/DIG. 26;
252/359.5; 239/343

[56] References Cited
UNITED STATES PATENTS

| 2,887,275 | 5/1959 | Dixon, Jr. et al. | 261/DIG. 26 |
| 3,051,264 | 8/1962 | Batchelor | 184/15 B |
| 3,148,747 | 9/1964 | Batchelor | 184/15 |
| 3,280,941 | 10/1966 | Fischer | 184/15 X |
| 3,388,868 | 6/1968 | Watson et al. | 159/DIG. 4 |

*Primary Examiner*—Manuel A. Antonakas
*Attorney*—Curtis, Morris & Safford

ABSTRACT: A method and apparatus is disclosed for foam lubricating and cleaning a chain conveyor. The apparatus includes an inclined mixing passageway adapted to receive pressurized foam-forming solution at one end thereof for passage through a restriction to decrease the pressure of the solution. Ambient air is drawn into the mixing passageway through a transverse bore by the decreased pressure of the solution. The mixture is then passed through a second restriction in the passageway to induce air entrainment in the solution and impacted against the transverse walls of a plurality of dispensing passageways. To further enhance air entrainment the dispensing passageways include expansion chambers in which the pressure of the admixture is further decreased. The finished foam is then delivered to various stations in contact with the conveyor chains.

PATENTED NOV 9 1971

3,618,713

INVENTOR.
Robert L. Batchelor
BY
Curtis, Morris & Safford
ATTORNEYS

FOAM LUBRICATING SYSTEM AND METHOD

This invention relates to lubricating systems and, more particularly, to lubricating systems for conveyor systems of the chain type.

Conveyor systems of the chain type are used extensively in food processing, dairy, breweries, bottling plants, etc., to provide for the transport of container packages, i.e. crates, cartons, cans, etc. Such conveyor systems employ a transport mechanism upon which the container packages are supported and carried along between separate points in the plant. Due to severe operating conditions, such transport mechanisms generally comprise a flexible, endless steel chain. It is evident, therefore, that considerable friction is developed within the working parts of the endless steel chain as well as against the chain channels along which it is "dragged" through the conveyor system. As hereinafter employed, working parts refers to those linkage structures effecting an interconnection of individual steel links to form the flexible, endless steel chain.

In conveyor systems of the chain type, the problem of lubricating and cleaning the endless steel chain and, more particularly, the working parts thereof has been ever present. In addition, and especially in plants processing items for human consumption, container package soilage which is a condition creating anything but an impression of dependable sanitation must be avoided. In the event that container package soilage results, considerable expenditures are necessary to clean such container packages prior to distribution thereof to the consumers. Accordingly, and to satisfy the various health and sanitary requirements, soap-type lubricants have been generally employed in lieu of oil lubricants.

It has been found that by prefoaming or aerating soap solution lubricants certain advantages are achieved. For example, aeration retards rapid runoff of the solution from the chains. This results in maintaining the lubricant on the chain longer for longer lubrication and more efficient cleaning. In addition, aeration results in a change of surface tension of the solution by increasing the particle or bubble size. As a result there is a visible change in color or transparency which enables the operator of the device to determine the presence and degree of lubrication on the chains. This change in surface tension also results in an efficient wetting out of the lubricant particles as a liquid surface film.

The presently available aeration systems utilize a compressed gas, generally air, to form the foam. The use of compressed air requires additional complex equipment and valves for the system and in addition increases the expense involved. Other systems involve spraying the soap solution at relatively high pressures on the chains through very fine openings or spray nozzles adjacent the point of application. During the shutdown periods of most of these systems, soap solution dehydrates in these small openings, plugging them and rendering the system inoperative.

Other methods of applying a foam solution to chains are available, such as that illustrated in my copending application, Ser. No. 840,259, filed July 9, 1969. These systems also utilize compressed air to form the foam and while they avoid plugging problems, they include mechanical valves to control the amount of lubricant solution and the amounts of air for the degree of aeration. These valves are exposed and thus subject to tampering or improper adjustment.

It is an object of this invention to utilize air at atmospheric pressure to foam a soap solution for chain conveyor lubrication. Another object of the invention is to provide a nonplugging foam lubricating system. It is a further object of the invention to provide a relatively simple and inexpensive system for incorporating atmospheric air in a soap solution to lubricate chain conveyors. It is a still further object of this invention to provide an improved and more efficient lubricating system for conveyor systems of the chain type.

A further appreciation of this invention will be had upon a consideration of the detailed description hereinafter set forth when taken in conjunction with the drawings wherein.

Figure 1:
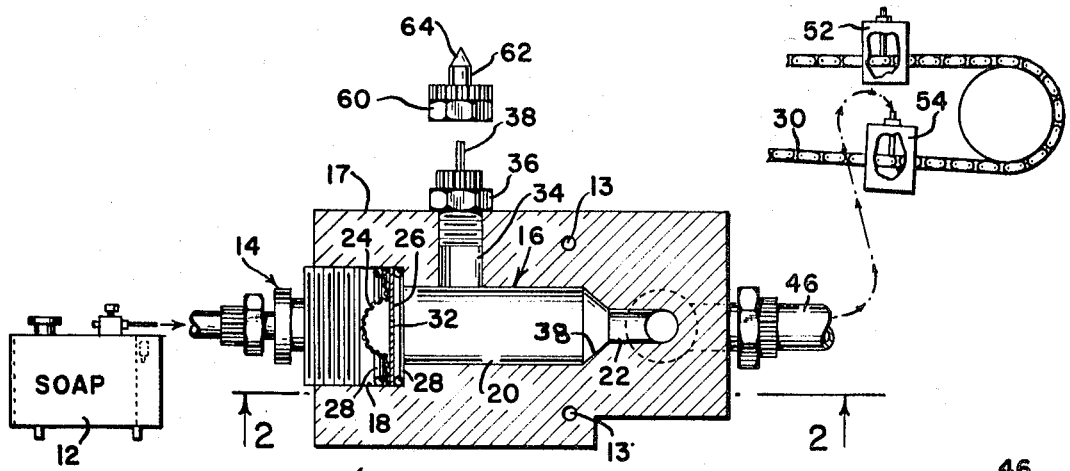
FIG. 1 is a somewhat schematic side view of the preferred embodiment of this invention.
Figure 2:
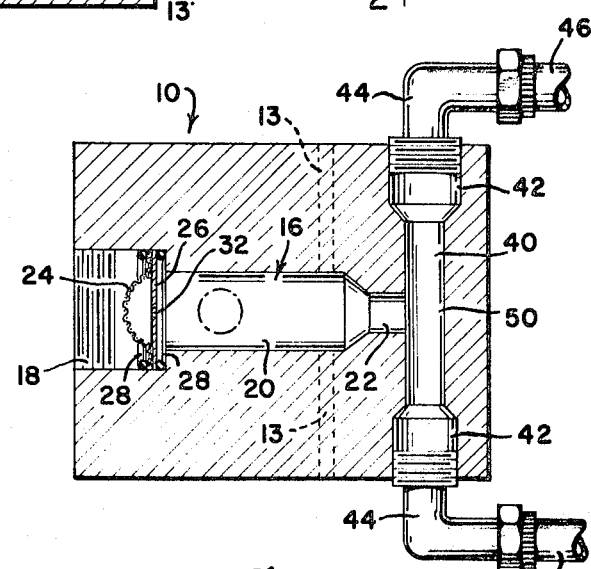
FIG. 2 is a view taken along line 2—2 of FIG. 1 of the foam mixing and dispensing apparatus.

With reference now to the drawings, and in particular to FIG. 1 there is illustrated a foam mixing and dispensing apparatus in the form of a block 10 for applying a lubricant foam to the chain conveyor 30. Block 10 includes a longitudinally extending bore 16 having three sections of varying diameters. As will be more fully explained hereinafter, bore 16 is slightly slanted in the longitudinal direction so that its central axis is slightly further from the top 17 of block 10 at the left end of its larger section 18 than at the right end of the smallest section 22. A plurality of bores 13 are provided in block 10 to facilitate mounting of the device. Block 10 may be formed of any suitable material but it has been found that transparent "Plexiglas" achieves satisfactory results. In addition, transparent "Plexiglas" has the advantage that it permits observation of the foam-forming process.

Lubricant soap is supplied, generally at a pressure of about 20 p.s.i. from the source 12 to dispensing apparatus 10 through fitting 14. A domed screen member 24 and an orifice plate 26 are removably mounted in bore section 18 by "O" rings 28. Rings 28 maintain screen 24 and plate 26 in sealing relation with the walls of the bore and thus all of the soap solution flows through the screen and plate. Screen 24 acts as a strainer or final filter for the soap solution and prevents unwanted particles from becoming lodged within block 10. It has been found that a 200-mesh U.S. Standard Sieve Size screen is suitable for this purpose.

Orifice plate 26 includes a small opening 32 through which the lubricant flows. The size of this opening is chosen to permit passage of the amount of lubricant required by the chain or chains of the conveyor used in each particular application. Orifice 32 acts in the manner of an expansion nozzle and thus the pressure of soap solution entering intermediate section 20 of bore 16 is decreased.

A transverse bore 34 is formed in block 10 and communicates at one end with section 20 downstream of orifice 32. A fitting 36, provided with a nipple 38 is threaded into bore 32 and provides free airflow through nipple 38 into section 20. Due to the decreased pressure of the soap solution entering section 20, ambient air at atmospheric pressure is drawn, by aspiration, through nipple 38 and fitting 36 for incorporation and mixture with the soap solution. In this manner the requirement of supplying compressed air for forming the foam is avoided. In addition, since the orifice plate is readily removed and replaced by a plate having a different orifice size, the necessity for manually operated mechanical valves to adjust the soap solution flow is also eliminated.

As the stream of lubricant and air flows through the transition section 38 of bore 16 into the smaller diameter section 22, the velocity of the stream is increased. This increased velocity induces incorporation, or penetration of the air into the soap solution to form the aerated foam.

Block 10 includes a pair of foam-dispensing bores having the same diameter as bore section 22. In the preferred embodiment illustrated there are two dispensing bores, however, it is foreseen that either one or more than two of such bores may be utilized. Bores 40 join bore section 22 at a generally right angle and each has an expanded end chamber 42. Fittings 44 are threaded into chambers 42 and provide connections for flexible tubes 46 for delivery of the foam to the lubricating chambers 52 and 54 through which the chains of conveyor 30 pass.

As the admixture of gas and air flows out of the end of bore section 22 it impacts against the dead end at junction 50 formed by the walls of bore 40. As a result the stream of admixture separates and flows into chambers 42 and fittings 44. Within chambers 42 the pressure is reduced again to further enhance air penetration and formation of the foamed lubricant. As the foam moves out through fittings 44 and tubes 46 it has the form of a wet lather. The surface tension of the soap solution is thus changed and the total volume of the solution has been substantially increased.

In many installations it is desirable to deliver lubricant at a greater rate to one zone than another. The distribution tubes 46 are of relatively small diameter so that they impose a predetermined restriction to the flow of foamed lubricant through them. Hence the rate at which lubricant is delivered to any particular zone may be varied relative to the rate delivered to the other zones by changing the length of its distribution tube.

As previously noted bore 16 is slanted longitudinally and its central axis is lower in left section 18 than in section 22. Due to this slant, when the flow of pressurized soap solution is shut off (by means not shown) the orifice 32 in plate 26 will remain flooded since liquid in section 20 will then move back towards the plate. As a result dehydration will not occur in the area of plate 26 and plugging of orifice 32 will not occur. The outlets of fittings 44 and tubes 46 are of sufficient size to prohibit plugging.

With an aspirating mixing and lather forming device of the preferred embodiment described it has been found that by supplying as little as three tenths (0.3) of a gallon per hour of soap solution at 20 p.s.i. a sufficient aeration can be achieved utilizing ambient air for the foamed lubricant to remain on the chains for 3 to 4 minutes before running off.

The ability to aspirate can be controlled to a considerable degree by the type of soap being used. For example in certain tests a soap solution produced by the Alex C. Fergusson Co., and sold under the Trademark "Lather-Lube," was used in a concentration of 70 parts water to 1 part soap and produced a foam which lasted for approximately 2 minutes before runoff from the chains. In other tests a concentration of 40 parts water to 1 part of this same soap was used with a resulting increase in aeration and a foam life of about 4 minutes.

For certain applications a wetter lather is desired. This is particularly the case in the labelling area of a bottle conveyor. A wetter lubricant is one having less air entrained therein and as a result has less tendency to climb a bottle and interfere with the labelling process.

To achieve a wetter lather with the mixing block of this invention, the air inlet fitting 36 is provided with a fitting 60 and cap means 62. Fitting 60 is threaded on the free end of fitting 36 and includes an annular bore in which cap 62 is removably fit. Cap 62 is formed of a flexible plastic material, such as one of the polyamides, and forms an airtight seal over nipple 38. By providing a small opening in the top 64 of cap 62, only a limited amount of air can be aspirated by the flowing soap solution through the bore 34 into bore section 20. This opening may be formed in any convenient manner and in the preferred embodiment a 05/10 needle was used to puncture the cap.

It is clear that the size of the opening formed is determined by the volume of ambient air desired in the system. In normal applications where maximum aeration is desired, cap 62 is omitted. On the other hand, where no aeration is required, or wanted, such as in the area of an electronic inspector which would reject a bottle having foam thereon, the cap is used intact to prevent airflow through nipple 38. This is a simple and inexpensive means for regulating the amount of air introduced into the mixing passageway or bore 16 and eliminates the requirement for adjusting valves.

The mixing block 10 of this invention may be conveniently modified for use in conditions where extremely dry foam under pressure is required. An extremely dry foam requires a large volume of gas or air and thus pressurized air from a compressed air source is necessary. This would be the case for bottles conveyed to a washer so that the foam will readily climb the bottle to facilitate movement of same into the washer pocket. This modification is illustrated in FIG. 3 wherein parts corresponding to those discussed above with respect to the embodiment of FIG. 1 are designated by like numerals.

Pressurized soap solution is provided as before from a source (not shown) through fitting 14 to the longitudinal bore in block 10. Strainer 24 and orifice plate 26 of the prior embodiment remain in bore section 18 to regulate the volume of soap solution introduced into block 10. Compressed air from a source 70 is introduced into bore 34 through fitting 36. The pressurized air flows through bore 34 into bore section 20, as in the prior embodiments, where it is incorporated with the soap solution as the mixture flows through restriction 38 and is impacted at junction 50. To increase incorporation of the pressurized air with the soap solution, a pair of spaced mesh screens 72 are fit in each of the opposed chambers 42. Screens 72 retain a plurality of small glass beads 74 therebetween. The body of beads 74 and the surfaces of screens 72 increase the surface area contacted by the admixture of soap and air, promotes air penetration, and breaks up the bubbles of air. The pressure of the admixture is also reduced by the expanded diameter of chamber 42, thereby further inducing aeration of the soap solution.

Figure 3:
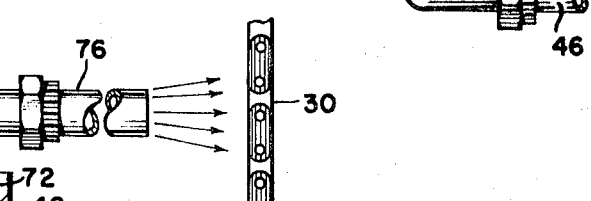
FIG. 3 is a plan view of a modified form of the invention.
Figure 3:
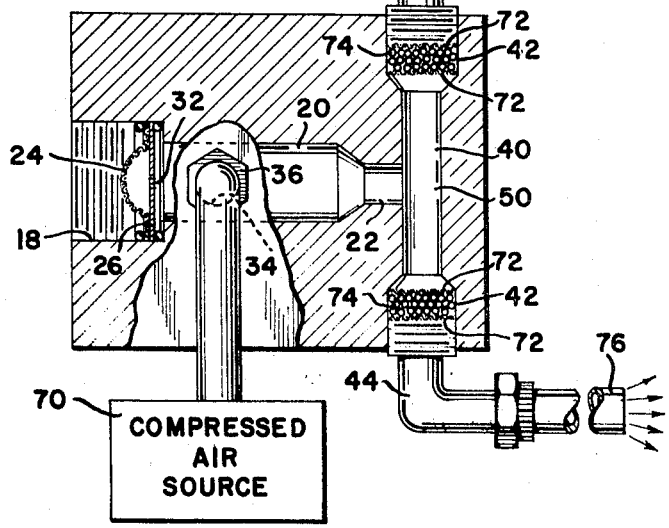

In this manner an extremely dry lather is discharged from both fittings 44, as seen in FIG. 3, through tubes 76, under pressure. This foam may be sprayed over a large area such as a multiplicity of chains 30 on the infeed of a bottle washer.

Alternatively, a dry pressurized foam may be provided for certain applications by supplying compressed air through one of the fittings 44. In this modification fittings 60 and cap 62 remain intact on fitting 36 to prevent ambient air flow through bore 34 as soap solution is supplied through orifice plate 26. Screens 72 and beads 74 in one of the chambers 42 are removed and compressed air is supplied through the fitting 44 associated with the now vacant chamber 42. The pressurized air flow through bore 40 picks up the desired amount of soap solution from bore 16 by aspiration and moves it towards the opposed bore 40 and its expansion chamber 42. The screens 72 and beads 74 in this chamber 42 serve, as in the prior embodiment, to promote air penetration, and break up the bubbles of air. The dry lather thus produced is than supplied through tube 76 under pressure to the desired point of application.

Although only certain embodiments of the present invention have been illustrated and described, it should be evident to those skilled in the art that various modifications may be incorporated in the device without departing from the invention concept thereof.

What is claimed is:

1. In a foam lubricating system for chain conveyors and the like, the combination of, a foam dispenser means including a mixing passageway communicating with at least one foam distribution passageway, means for supplying foam-forming solution under pressure to said mixing passageway, first restrictor means positioned in said mixing passageway for providing a pressure drop downstream thereof, means for providing communication between said mixing passageway and the atmosphere downstream of said first restrictor, whereby ambient air is drawn into said mixing passageway by said pressure drop, second restrictor means in said mixing passageway downstream of said communication means for providing a further pressure drop and incorporating said air in said solution, said foam distribution passageway providing an impact zone downstream from said second restrictor means and an expansion chamber section downstream of said impact zone to enhance air incorporation in said solution and means associated with said distribution passageway for delivering foam from said expansion chamber to said chain conveyors.

2. The apparatus as described in claim 1 wherein said foam distribution passageway comprises a pair of opposed bores in said dispenser means communicating at right angles with said mixing passageway whereby the foam discharged from said mixing passageway impacts against the walls of said bores and flows into the expansion chamber section of each of said bores to enhance air incorporation in said solution.

3. The apparatus as described in claim 2 wherein said means for delivering foam comprises a flexible tube associated with each of said bores which extends to various sections of said conveyors where lubricant is desired and wherein the length of each of said tubes is such as to provide a controlled restriction to the flow therethrough.

4. The apparatus as described in claim 1 including strainer means for said solution in said mixing passageway upstream of said first restrictor means.

5. The apparatus as described in claim 4 wherein said strainer comprises a dome-shaped screen and said first restrictor comprises a generally flat plate downstream of said screen and having an orifice therein, said screen and said plate being secured in said passage by means of a pair of sealing rings.

6. The apparatus as defined in claim 5 wherein said mixing passageway is slanted longitudinally upwardly in the direction of flow, whereby said orifice remains flooded when said means for supplying solution is shut off.

7. The apparatus as described in claim 1 wherein said second restrictor means comprises a decrease in diameter of said mixing passageway downstream of said communicating means.

8. The apparatus as described in claim 1 wherein said communicating means includes removable cap means for preventing airflow into said mixing passageway.

9. The apparatus as described in claim 8 wherein said cap means is formed of a plastic material and is adapted to be punctured for regulating airflow through said communicating means.

10. The apparatus as described in claim 1 wherein said mixing passageway is slanted upwardly from said solution supply means to said dispensing passageway whereby said first restrictor remains flooded when the operation of the device is completed, to prevent clogging thereof by dehydration of said solution.

11. In a foam lubricating system for chain conveyors and the like, the combination of, a foam dispenser means including a foam-forming passageway, means for supplying foam-forming solution under pressure to said passageway, means for supplying gas under pressure to said passageway downstream of said solution-supplying means, restriction means in said passageway downstream of the point of introduction thereto of said gas under pressure for incorporating said air in said solution, said passageway providing an impact zone downstream from said restriction to enhance air incorporation in said solution, and means in said passageway, downstream of said impact zone, for enhancing gas penetration into said solution, said enhancing means including first and second spaced straining means and a plurality of beads positioned between said straining means.

12. The apparatus as defined in claim 11 wherein said enhancing means comprises a pair of expansion chambers communicating with said passageway, each of said expansion chambers being located on opposite sides of said impact zone and having first and second spaced straining means and a plurality of beads positioned between said straining means.

13. The apparatus as defined in claim 11 including means associated with said passageway for delivering foam from said passageway to said chain conveyor.

14. The method of forming a foam lubricant for chain conveyors and the like comprising, the steps of, supplying a pressurized foam-forming solution to a flow path, decreasing the pressure of said solution, drawing ambient air into said flow path, inducing gas penetration into the solution to induce bubble formations, impacting the admixture against the walls of a discharge passageway, decreasing the pressure of said admixture, and conveying said admixture to the conveyor for use.

* * * * *